United States Patent
Tanaka et al.

(10) Patent No.: US 7,687,602 B2
(45) Date of Patent: Mar. 30, 2010

(54) DEPROTEINIZED NATURAL RUBBER, ITS COMPOSITION AND USE THEREOF

(75) Inventors: Yasuyuki Tanaka, Hachioji (JP); Jitladda Sakdapipanich, Bangkok (TH)

(73) Assignee: Sumitomo Rubber Industries, Ltd., Kobe, Hyogo (JP)

( * ) Notice: Subject to any disclaimer, the term of this patent is extended or adjusted under 35 U.S.C. 154(b) by 0 days.

(21) Appl. No.: 10/566,730

(22) PCT Filed: Dec. 18, 2003

(86) PCT No.: PCT/JP03/16254

§ 371 (c)(1),
(2), (4) Date: Feb. 2, 2006

(87) PCT Pub. No.: WO2005/012365

PCT Pub. Date: Feb. 10, 2005

(65) Prior Publication Data

US 2006/0252879 A1 Nov. 9, 2006

(30) Foreign Application Priority Data

Aug. 4, 2003 (WO) ........................ PCT/JP03/09880

(51) Int. Cl.
*C08C 1/14* (2006.01)

(52) U.S. Cl. ........................ 528/489; 528/488; 528/931; 528/932

(58) Field of Classification Search ................. 524/571; 528/488, 489, 931, 932
See application file for complete search history.

(56) References Cited

U.S. PATENT DOCUMENTS

| 5,580,942 A | * | 12/1996 | Cornish ........................ 528/1 |
| 6,335,407 B1 | * | 1/2002 | Tanaka et al. ............ 526/238.3 |
| 2002/0193490 A1 | * | 12/2002 | Baranek ...................... 524/430 |

FOREIGN PATENT DOCUMENTS

| DE | 19622169 A | | 12/1996 |
| EP | 0805163 A | | 11/1997 |
| EP | 1205491 A2 | | 5/2002 |
| GB | 571494 A | | 8/1945 |
| JP | 6329838 A | | 11/1994 |
| JP | 2000-007708 A | | 1/2000 |
| JP | 2001122906 A | * | 5/2001 |
| JP | 2003-030301 A | | 1/2003 |
| JP | 2003-056902 A | | 2/2003 |

OTHER PUBLICATIONS

Cornish et al., Enc. Poly. Sci. and Tech., 2004, (John Wiley and Sons).*
Hayakawa et al., Eviron. Dermatol.. vol. 6, pp. 10-16 (1999).

* cited by examiner

*Primary Examiner*—Mark Eashoo
*Assistant Examiner*—Angela C Scott
(74) *Attorney, Agent, or Firm*—Birch, Stewart, Kolasch & Birch, LLP

(57) ABSTRACT

There are provided natural rubber free from substances which cause Type I allergy, a rubber compositions having good processability and physical properties which comprises the natural rubber and other rubber, and a tire product comprising the natural rubber.

The natural rubber of the present invention exhibits the above properties by containing substantially no proteins specified by the bands of 14, 31 and 45 kDa by SDS-PAGE.

6 Claims, 4 Drawing Sheets

DEPROTEINIZED NATURAL RUBBER, ITS COMPOSITION AND USE THEREOF

FIELD OF THE INVENTION

The present invention relates to natural rubber free from proteins, and a composition and use thereof. More specifically, it relates to natural rubber which substantially does not contain proteins with specific molecular weight which are characteristic of natural rubber latex, and a composition and use thereof.

BACKGROUND OF THE INVENTION

Heretofore, natural rubber has been applied to a wide variety of products ranging from industrial products such as tires for automobiles and aircraft, conveyer belts and adhesives to household products such as gloves. Natural rubber is collected as latex containing water, proteins, inorganic salts and the like in addition to the rubber component and this latex is coagulated to give crude rubber (crepe rubber or smoked sheet rubber). A target rubber product is produced from this crude rubber through mastication, addition of compounding agents, molding, and vulcanization.

Fresh latex of natural rubber contains non-rubber components such as proteins, lipids, carbohydrates and inorganic substances in addition to about 30 to 35% w/v (by weight/volume) of rubber component. Solid natural rubber (crude rubber) obtained by coagulating the fresh latex with formic acid contains about 6 wt % of the non-rubber components. These non-rubber components are known to be important for natural rubber to exhibit specific physical properties. However, it has become a social problem around 1990 that some of proteins contained in natural rubber latex products, gloves in particular, cause Type I acute allergy, and Food and Drug Administration (FDA) in U.S.A. has issued a medical alert toward manufacturers of rubber products to reduce soluble proteins contained in latex products.

Following methods are known as a technique for reducing proteins in latex, (i) a method of successive centrifuging the latex, (ii) a method of treating the latex with a proteolytic enzyme, (iii) a method of treating the latex with alkali, and (iv) a method of treating enzymatically deproteinized latex with alkali (refer to JP-A 30301 (2003)). However, even after treatments by these (i), (ii), and (iii) methods, the resulting natural rubber still contains a substantial amount of nitrogenous compounds and they are not able to be free from Type I allergic reactions. Moreover, the methods (ii) and (iv) using a proteolytic enzyme are resulted in the formation of rubber containing residual proteins originated from the enzyme, which can be some allergen. Furthermore, the method (iv) requires troublesome and costing two steps of treatment, i.e., the treatment of the proteolytic enzyme followed by alkali treatment and showed no finding to prove the formation of rubber free from allergy.

As a result of extensive studies on proteins contained in natural rubber latex, the present inventors have found that it is difficult to remove all proteins by ordinary proteolytic enzymes. Because, the proteins in the natural rubber are present in the serum of the latex and on the surfaces of rubber particles in the latex as shown in FIG. 1. The surface of the rubber particles in latex is known to be stabilized by a double-layer comprising of lipids and proteins.

Thus, by the method (i) of centrifuging the latex, the proteins in the serum can be removed, but the proteins on the surfaces of the rubber particles cannot be removed. Meanwhile, by the method (ii) of treating the latex with a proteolytic enzyme or the method (iii) of treating the latex with alkali, although the proteins on the surfaces of the rubber particles can be decomposed, coagulation of the rubber particles occurs during the treatment, so that enzymatic hydrolysis or chemical hydrolysis of the proteins remaining on the rubber particles becomes extremely slow, thereby making it impossible to remove all of the remaining proteins. Moreover, by the method (ii) the presence of residual proteins from the proteolytic enzyme is inevitable.

Under the circumstances, one of the present inventors has made intensive studies. As a result, he has found a method of producing natural rubber containing a reduced amount of nitrogen to 0.02% or less, the content of which is known to be an index of the protein content, and already filed a patent application for the invention (refer to JP-A 56902 (2003)). The method comprises the steps of treating natural rubber latex with a surfactant and a proteolytic enzyme and then concentrating and washing the treated latex once or twice by centrifugation. Since the latex obtained by this method has highly deproteinized, gloves prepared by use of the low-protein natural rubber reduce the possibility for Type I allergic reactions.

However, in this deproteinization method, the addition of about 1% of a surfactant or surfactants makes it difficult to produce solid natural rubber by an ordinary coagulation method. In addition, the method requires a step of removing decomposed proteins by centrifugation. Accordingly, the method is not suitable for mass production of natural rubber. Further, it has been confirmed by a clinical test with a scratch method, which is a more strict testing method, that about 8% of patients are still positive for Type I allergy with respect to the low-protein natural rubber obtained by this method (R. Hayakawa et. al., Environ. Dermatol., 6, 10 (1999)), indicating that deproteinization by this method is not complete.

DETAILED DESCRIPTION OF THE INVENTION

Problems to be Solved by the Invention

Therefore, an object of the present invention is to investigate the substances which cause allergic reactions, and based on the findings obtained here to provide natural rubber free from substances determined to be the cause of Type I allergy.

Another object of the present invention is to provide a rubber composition having good processability and physical properties by compounding the natural rubber of the present invention with other rubber.

Still another object of the present invention is to provide a tire product comprising the above natural rubber of the present invention.

Other objects and advantages of the present invention will be apparent from the following description.

MEANS FOR SOLVING THE PROBLEMS

Figure 1:
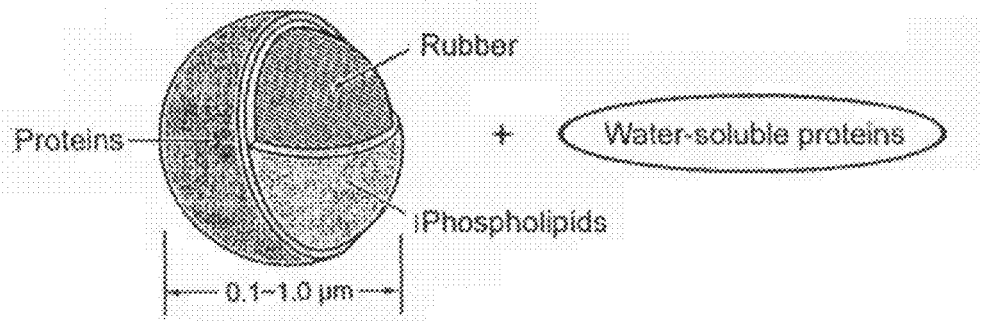
FIG. 1 is a schematic illustration of the distribution of proteins in natural rubber latex.

According to the present invention, firstly, the above objects and advantages of the present invention are achieved by natural rubber which contains substantially no proteins specified by the bands of 14, 31 and 45 kDa by an SDS-PAGE method.

Further, according to the present invention, secondly, the above objects and advantages of the present invention are achieved by a rubber composition comprising the above natural rubber of the present invention and other rubber.

Finally, according to the present invention, thirdly, the above objects and advantages of the present invention are achieved by tires produced by use of the above natural rubber of the present invention.

BEST MODE FOR EMBODIMENTS OF THE INVENTION

Hereinafter, the present invention will be further described. Firstly, a description will be given to a method for producing the natural rubber of the present invention.

The method for producing the natural rubber of the present invention is carried out by saponifying natural rubber latex with an alkali hydroxide in the presence of an anionic surfactant or nonionic surfactant, coagulating the saponified latex, and then washing the coagulated rubber with an aqueous solution of an alkali hydroxide or a surfactant as required.

When the natural rubber latex is saponified with the alkali hydroxide, coagulation of the latex can be prevented by use of the anionic surfactant or nonionic surfactant as described above. That is, although an anionic surfactant, a cationic surfactant and a nonionic surfactant are known as surfactants, a nonionic surfactant and/or an anionic surfactant must be used in this case.

Illustrative examples of usable nonionic surfactants include polyoxyalkylene ether nonionic surfactants, polyoxyalkylene ester nonionic surfactants, polyhydric alcohol fatty acid ester nonionic surfactants, sugar fatty acid ester nonionic surfactants and alkylpolyglycoside nonionic surfactants. Specific examples of the polyoxyalkylene ether nonionic surfactants include a polyoxyalkylene alkyl ether, a polyoxyalkylene alkyl phenyl ether, a polyoxyalkylene polyol alkylene ether, a polyoxyalkylene styrenated phenol ether, a polyoxyalkylene distyrenated phenol ether, and a polyoxyalkylene tristyrenated phenol ether.

The polyoxyalkylene polyol of the above polyoxyalkylene polyol alkylene ether may be a polyhydric alcohol having 2 to 12 carbon atoms. Illustrative examples thereof include propylene glycol, glycerin, sorbitol, sucrose, pentaerythritol, and sorbitan.

Illustrative examples of the polyoxyalkylene ester nonionic surfactants include a polyoxyalkylene fatty acid ester.

Illustrative examples of the polyhydric alcohol fatty acid ester nonionic surfactants include a fatty acid ester of a polyhydric alcohol having 2 to 12 carbon atoms and a fatty acid ester of a polyoxyalkylene polyhydric alcohol. Specific examples thereof include sorbitol fatty acid ester, sorbitan fatty acid ester, fatty acid monoglyceride, fatty acid diglyceride, and a polyglycerin fatty acid ester. Further, their polyalkylene oxide adducts (such as a polyoxyalkylene sorbitan fatty acid ester and a polyoxyalkylene glycerin fatty acid ester) can also be used.

Illustrative examples of the sugar fatty acid ester nonionic surfactants include fatty acid esters of sucrose, glucose, maltose, fructose and polysaccharides. Their polyalkylene oxide adducts can also be used.

Illustrative examples of the alkylpolyglycoside nonionic surfactants include an alkylglucoside, an alkylpolyglucoside, a polyoxyalkylene alkylglucoside and a polyoxyalkylene alkylpolyglucoside. Further, their polyalkylene oxide adducts can also be used.

Preferred examples of the fatty acids of the above polyhydric alcohol fatty acid ester and sugar fatty acid ester surfactants are a linear or branched saturated or unsaturated fatty acid having 4 to 30 carbon atoms.

The alkyl group in the surfactant is exemplified by an alkyl group having 4 to 30 carbon atoms. Further, the polyoxyalkylene group is exemplified by one having an alkylene group having 2 to 4 carbon atoms, more specifically, one with about 1 to 50 added moles of ethylene oxide.

Illustrative examples of the anionic surfactant include carboxylic acid based anionic surfactants, sulfonic acid based anionic surfactants, sulfuric ester anionic surfactants and phosphoric ester anionic surfactants.

Illustrative examples of the carboxylic acid based surfactants include a fatty acid salt, polyvalent carboxylate, rosinate and tall oil fatty acid salt which have 6 to 30 carbon atoms. A carboxylate having 10 to 20 carbon atoms is preferred. When the number of carbon atoms is 6 or less, dispersion and emulsification of proteins and impurities are insufficient, while when the number of carbon atoms is 30 or more, the surfactant becomes difficult to be dispersed in water.

Illustrative examples of the sulfonic acid based surfactants include an alkyl benzene sulfonate, an alkyl sulfonate, an alkyl naphthalene sulfonate, naphthalene sulfonate and diphenylether sulfonate.

Illustrative examples of the sulfuric ester surfactants include an alkyl sulfate, a polyoxyalkylene alkyl sulfate, a polyoxyalkylene alkyl phenyl ether sulfate, tristyrenated phenol sulfate and a polyoxyalkylene distyrenated phenol sulfate. Illustrative examples of the salts of these compounds include metal salts (such as Na, K, Ca, Mg and Zn), ammonia salts and amine salts (such as a triethanolamine salt).

Illustrative examples of the phosphoric ester surfactants include an alkyl phosphate and a polyoxyalkylene phosphate. Illustrative examples of the salts of these compounds include metal salts (such as Na, K, Ca, Mg and Zn), ammonia salts and amine salts (such as a triethanolamine salt).

The above described surfactant is preferably added in an amount of 0.01 to 0.7% (w/v), more preferably 0.03 to 0.5%, particularly preferably 0.05 to 0.3%, based on the rubber latex. When the amount is smaller than the lower limit, the effect of the surfactant is not sufficient, while when the amount is larger than the upper limit, the coagulation reaction of the rubber latex after the saponification reaction is liable to become difficult to occur.

The conventional method which has already been filed as a patent application and proposed by one of the present inventors, i.e., the method of producing natural rubber having the nitrogen content of 0.02% or less by treating natural rubber latex with a surfactant and a proteolytic enzyme must use the surfactant in an amount of at least about 1%. Accordingly, it is one of advantages of the method of the present invention that natural rubber having low protein content can be produced by use of a less amount of surfactant as described above. It is also one of reasons why the method of the present invention is suitable for mass production.

Further, the method of the present invention is also excellent in that it can produce natural rubber leaving intact fatty acids which are known to play an important role to express physical properties peculiar to the natural rubber.

Further, as the alkali hydroxide for saponifying the natural rubber latex, sodium hydroxide or potassium hydroxide is preferably used, for example. The amount of the alkali hydroxide is preferably 1 to 10% (w/v) based on the rubber latex. When the amount is smaller than 1%, the reaction time becomes too long, while when the amount is larger than 10%, the coagulation reaction is liable to occur. A more preferred amount is 1 to 8%. When the amount of the alkali hydroxide is too large, a large portion of the lipids becomes liable to be saponified and removed. It is preferable that the alkali hydroxide as 10 to 30 wt % aqueous solution is added to the natural rubber latex.

The natural rubber latex saponified with the alkali hydroxide and the surfactant may be fresh natural rubber latex or high ammonia latex.

Although the reaction time is not particularly limited, the reaction is preferably carried but from several minutes to about one day. Further, during the reaction, the latex may be agitated or left to stand. However, the latex is preferably agitated so as to accelerate the reaction. In addition, the temperature may be adjusted as required, and a suitable temperature is 5 to 90° C., more preferably 20 to 70° C.

In the method of the present invention, after saponification, a coagulant is added so as to coagulate the rubber latex.

As the coagulant, a combination of polymer flocculant and acid, a combination of salt and acid, and/or a combination of all of these are/is preferably used.

Illustrative examples of the polymer flocculant include anionic, cationic and nonionic polymer flocculants. The anionic and cationic polymer flocculants are preferred. Specific examples of the anionic polymer flocculants include a poly(sodium acrylate), a poly(ammonium acrylate) and a poly(sodium styrene sulfonate). Specific examples of the cationic polymer flocculants include a poly(ethylene amine), a poly(2-hydroxypropyl-N-methylammoniumchloride), a poly(2-hydroxypropyl-1,1-N-dimethylammoniumchloride), a poly[N-(dimethylaminomethyl)acrylamide], a poly(2-vinylimidazoliniumbisulfate), a poly(diallyldimethylammoniumchloride), a poly(N,N-dimethylaminoethylmethacrylate) and a poly[N-(dimethylaminopropyl)methacrylamide].

Further, as the salt, a variety of inorganic salts can be used. Preferred examples thereof include sodium chloride, ammonium phosphate, ammonium sulfate and calcium nitrate. As the acid, a variety of inorganic acids and organic acids are used. However, sulfuric acid, formic acid, acetic acid and the like are preferably used from a practical standpoint.

The coagulated latex is then subjected to solid-liquid separation by means known per se. After the separation, the resulting rubber may be washed with an aqueous solution of an alkali hydroxide and/or a surfactant or immersed in an aqueous solution of an alkali hydroxide and/or a surfactant as required so as to further reduce nitrogen contained in the rubber or lessen color peculiar to the natural rubber latex.

A series of these reactions can be carried out in a batch or continuous manner. In the continuous manner, an alkali hydroxide and a surfactant are continuously added in natural rubber latex, and after completion of the saponification reaction, by use of, for example, a line mixer, a coagulant is continuously added so as to coagulate the saponified latex continuously. Thereby, a method of producing natural rubber continuously, which has heretofore been impossible, can be adopted. Thus, the method of the present invention is a remarkable and excellent method capable of mass-producing natural rubber at low cost.

The natural rubber with a reduced nitrogen content which is produced by the above method of the present invention is characterized in that it contains substantially no proteins specified by the bands of 14, 31 and 45 kDa as analyzed by SDS-PAGE (SDS-Polyacrylamide Gel Electrophoresis) with a molecular weight calibration curve by using standard molecular weight markers. In this regard, the natural rubber is different from the conventionally known natural rubber with reduced nitrogen content.

The natural rubber of the present invention may have the nitrogen content of 0.02 to 0.30% by weight. Furthermore, the natural rubber of the present invention contains substantially no proteolytic enzyme and its decomposed compounds.

That is, it has been confirmed with analysis by SDS-PAGE that the natural rubber having reduced nitrogen content of 0.02% or less which has been produced by the conventional method, using a surfactant and a proteolytic enzyme, still shows these bands indicating the presence of residual specific proteins. More specifically, when the natural rubber of the present invention is compared with the natural rubber obtained by the above conventional method on the same level of nitrogen content, it has been found that as analyzed by SDS-PAGE, the bands of 14, 31 and 45 kDa substantially or completely disappeared from the natural rubber of the present invention, while the above bands, though in very small amounts, are still present in the natural rubber obtained by the above conventional method. Further, when the natural rubber latex treated by the above conventional method is subjected to centrifugation, the bands of proteins peculiar to natural rubber latex are clearly found in its serum phase, ensuring that undecomposed proteins remain in the latex. Meanwhile, when the natural rubber latex treated by the method of the present invention is subjected to centrifugation, no such bands are found in its serum phase. Hence, it is easily confirmed that the coagulated natural rubber latex after the reactions is free from these proteins.

Further, it has been found that the proteins specified by the bands of 14, 31 and 45 kDa by SDS-PAGE are substances to cause Type I allergy, and based on this fact, it has been found by studies of the present invention that natural rubber which is substantially free from the bands of 14, 31 and 45 kDa when analyzed by SDS-PAGE can provide rubber products such as a glove which can be used safely on patients having Type I allergy with no problem even if the natural rubber contains a slightly large amount of nitrogen.

It has also been found that the reason why the natural rubber of the present invention as described above is different from the conventional natural rubber, i.e., the nitrogen content of the natural rubber resulting from deproteinization using a proteolytic enzyme is reduced by selective cuttings of some of the amide bonds in the proteins by the proteolytic enzyme, while saponification using an alkali hydroxide according to the present invention hydrolyzes the amide bonds in the proteins unselectively and stoichiometrically, thereby achieving a low molecular weight. Therefore, the natural rubber of the present invention is characterized in that it is not limited by the content of remaining nitrogen and contains substantially no proteins peculiar to natural rubber latex and proteolytic enzyme.

Further, the natural rubber of the present invention has lower green strength than the conventional natural rubber. The conventional natural rubber specimen from latex has a green strength of about 8 to 10 MPa and the specimen from the natural rubber latex deproteinized by the enzyme method has a green strength of about 4 to 6 MPa, whereas the natural rubber of the present invention has a green strength of about 0.1 to 3 MPa.

For this reason, a mastication process using a Banbury mixer or the like which is essential in processing of the conventional natural rubber can be omitted depending on products, which is very advantageous from the viewpoint of energy conservation.

The physical properties of the vulcanized natural rubber of the present invention are no different from those of the conventional natural rubber, and compositions comprising the natural rubber of the present invention and various synthetic rubbers also show excellent vulcanized rubber properties. As the synthetic rubbers, all rubbers which can be blended with the conventional natural rubber, can be used. Illustrative examples thereof include styrene butadiene rubber (SBR), acrylonitrile butadiene rubber (NBR), polybutadiene rubber (BR), synthetic polyisoprene (IR), ethylene propylene rubber (EPR), ethylene propylene diene monomer rubber (EPDM) and isobutylene isoprene rubber (IIR). It has been confirmed that the vulcanization physical properties of rubber compositions comprising the natural rubber of the present invention and these synthetic rubbers are comparable to or better than those of rubber compositions comprising the conventional natural rubber and these synthetic rubbers and that the saponification according to the present invention does not affect the vulcanized rubber properties of the rubber compositions.

Due to the foregoing excellent physical properties, natural rubber obtained by saponification according to the present invention is very useful for such applications as tires and other natural rubber products.

Hereinafter, the present invention will be described in more detail with reference to Examples. However, the present invention shall not be limited by these Examples in any way.

EXAMPLES

Example 1

To 1.9 L of fresh latex (abbreviated as FL-latex) adjusted to a DRC (Dry Rubber Content) of 30%, aqueous solution of NaOH containing 30 g of NaOH in 100 mL water and 4 g of Triton X-100 (isooctylphenoxypoly-ethoxyethanol, BDH Laboratories Suppliers, Co.) as a nonionic surfactant were added, and the saponification reaction was carried out at 70° C. for 3 hours. To the resulting latex, 300 mL of 0.025% (w/v) Floerger as an anionic polymer flocculant was added. Then, 1.5 L of 5% (w/v) formic acid was added so as to coagulate the rubber, which was then washed with water and dried at 50° C. for 2 days. The obtained saponified natural rubber (abbreviated as SAP-NR-1) had the nitrogen content of 0.133%. About 5 g of this rubber was pressed into a sheet having a size of 5 cm×5 cm and a thickness of 0.2 to 0.3 mm. This coagulated rubber was cut into a slit (2 mm×10 mm×1 mm) and then extracted twice by use of 2% (w/v) aqueous SDS (Sodium Dodecyl Sulfate) 10 mL with stirring at room temperature for 24 hours. The extract was dialyzed by use of a membrane having a cutoff molecular weight of 3.5 kDa for 24 hours. To 300 μL of this solution, 100 μL of acetone containing 10% trichloroacetic acid was added to precipitate the proteins. The precipitate was collected by centrifugation, washed with acetone, and then dissolved in 50 μL of 8 M urea aqueous solution so as to obtain an extract corresponding to sixfold concentration. This extract was measured by use of SDS-PAGE (Polyacrylamide Gel Electrophoresis).

Figure 2:
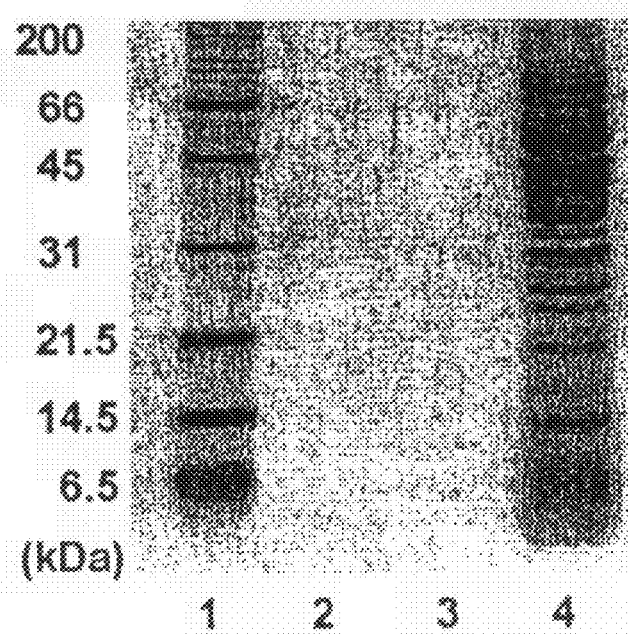
FIG. 2 is a diagram showing the results of measurements of the rubbers obtained in Examples 1 and 2 of the present invention by SDS-PAGE.

The result of the measurement by SDS-PAGE of the extract is shown in FIG. 2. In FIG. 2, Lane 1 denotes standard molecular weight markers, Lane 2 corresponds to Example 1 (SAP-NR-1), Lane 3 corresponds to Example 2 (SAP-NR-1-1), and Lane 4 denotes the extract from serum of fresh latex.

In this measurement, SAP-NR-1 showed no bands peculiar to the proteins in the rubber. It was revealed that SAP-NR-1 contained no proteins showing the bands of 14, 31 and 45 kDa by SDS-PAGE despite the nitrogen content of 0.133%.

For comparison, the result of measurement by SDS-PAGE of the serum extract of fresh latex under the same conditions is also shown in FIG. 2. The bands of 14, 31 and 45 kDa can be clearly recognized.

Example 2

After saponification and coagulation in the same manner as in Example 1, the resulting natural rubber was immersed in a 3% (w/v) NaOH aqueous solution at 70° C. for 1.5 hours followed by washing with water and drying under the same conditions as used in Example 1. The nitrogen content of the obtained rubber (SAP-NR-1-1) was very low at 0.025%. The result of SDS-PAGE analysis made under the same conditions as used in Example 1 is shown in FIG. 2. As it is expected in this case as well, it was revealed that the rubber contained no protein showing bands of 14, 31 and 45 kDa as measured by SDS-PAGE.

Comparative Example 1

To 2 L of fresh latex with a DRC of 10%, 20 g of SDS and 0.8 g of Alcalase 2.0T (NOVO Nordisk Bioindustry Co.) as a proteolytic enzyme were added, and the reaction was carried out at room temperature for 24 hours. The reacted latex was concentrated to a DRC of 60% by centrifugation at 15,000 rpm for 30 minutes. The concentrated latex was diluted to 10% DRC and concentrated to 60% DRC again by centrifugation in a similar way mentioned above.

Figure 3:
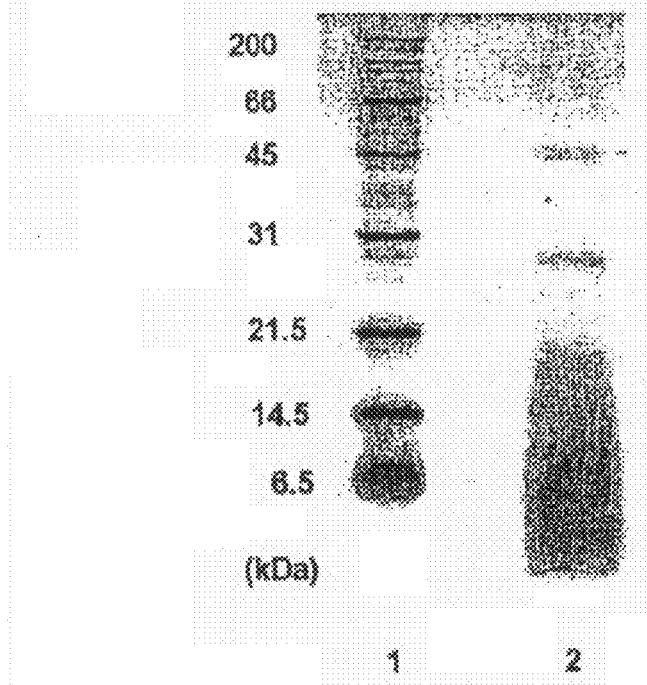
FIG. 3 is a diagram showing the result of measurement of the natural rubber obtained in Comparative Example 1 by SDS-PAGE.

The nitrogen content of the resulting deproteinized natural rubber coagulated by acetone was 0.018%. This coagulated rubber was cut into a slit, which was then measured by SDS-PAGE in the same manner as in Example 1. The result is shown in FIG. 3. In FIG. 3, Lane 1 denotes standard molecular weight markers, and Lane 2 corresponds to Comparative Example 1. The presence of the bands of 31 and 45 kDa as well as a broad band around 21 kDa was seen in Lane 2.

Examples 3 to 8

Experiments were conducted under the same conditions as used in Example 1. The conditions for saponification are shown in Table 1.

TABLE 1

| | Conditions for Saponification | Nitrogen Content of Obtained Rubber (w/w %) |
|---|---|---|
| Ex. 3 | NaOH 1%/Room Temperature/1 Hour | 0.336 |
| Ex. 4 | NaOH 1%/70° C./1 Hour | 0.133 |
| Ex. 5 | NaOH 2%/Room Temperature/5 Hours | 0.147 |
| Ex. 6 | NaOH 2%/Room Temperature/25 Hours | 0.080 |
| Ex. 7 | NaOH 3%/70° C./1 Hour | 0.100 |
| Ex. 8 | NaOH 3%/70° C./5 Hours | 0.119 |

Ex. = Example
Note:
The conditions for saponification indicate the concentration of NaOH, reaction temperature, and reaction time.

Figure 4:
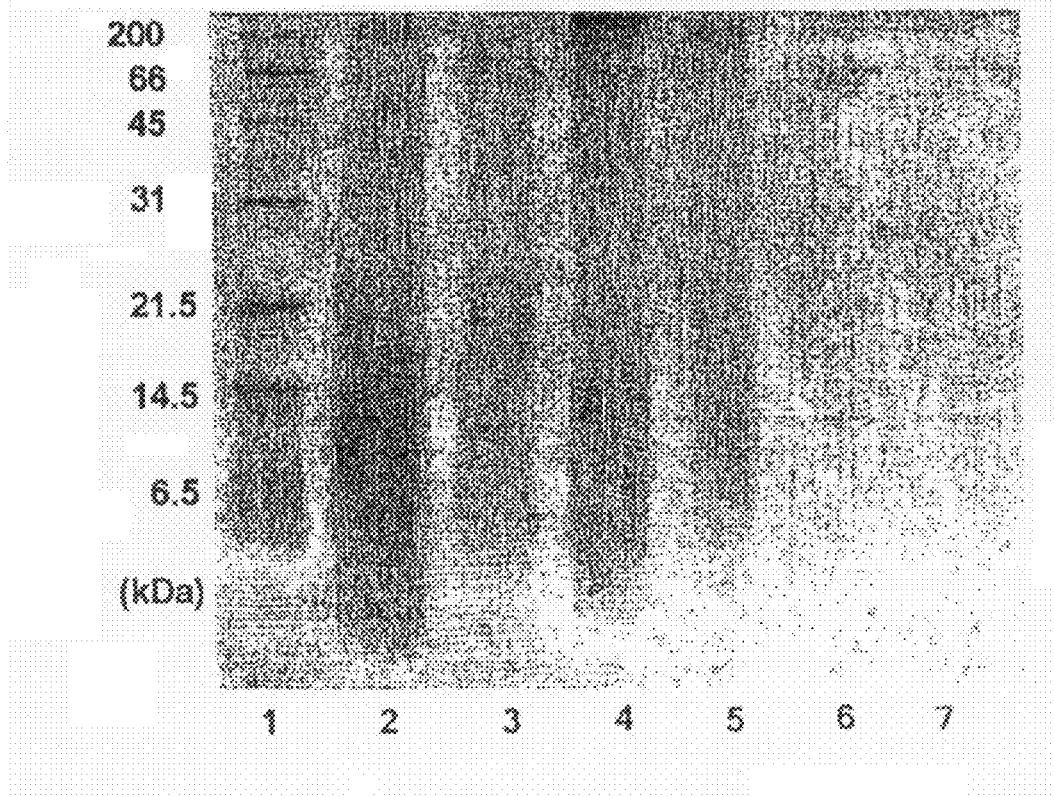
FIG. 4 is a diagram showing the results of measurements of the natural rubbers obtained in Examples 3 to 8 of the present invention by SDS-PAGE.

The results of measurements made on the obtained rubbers by SDS-PAGE under the same conditions as used in Example 1 are shown in FIG. 4. In FIG. 4, Lane 1 denotes standard molecular weight markers, and Lanes 2 to 7 corresponds to Examples 3 to 8, respectively. According to the results of the measurements by SDS-PAGE, under the conditions (NaOH 1% (w/v), room temperature, 1 hour) of Example 3, a protein band of around 14 kDa somewhat appeared (Lane 2), although the bands of 31 and 45 were nearly absent. Under the conditions of Examples 4 to 8, the bands of 14, 31 and 45 did not appear at all, indicating that proteins were removed completely under these saponification conditions.

Example 9

Figure 5:
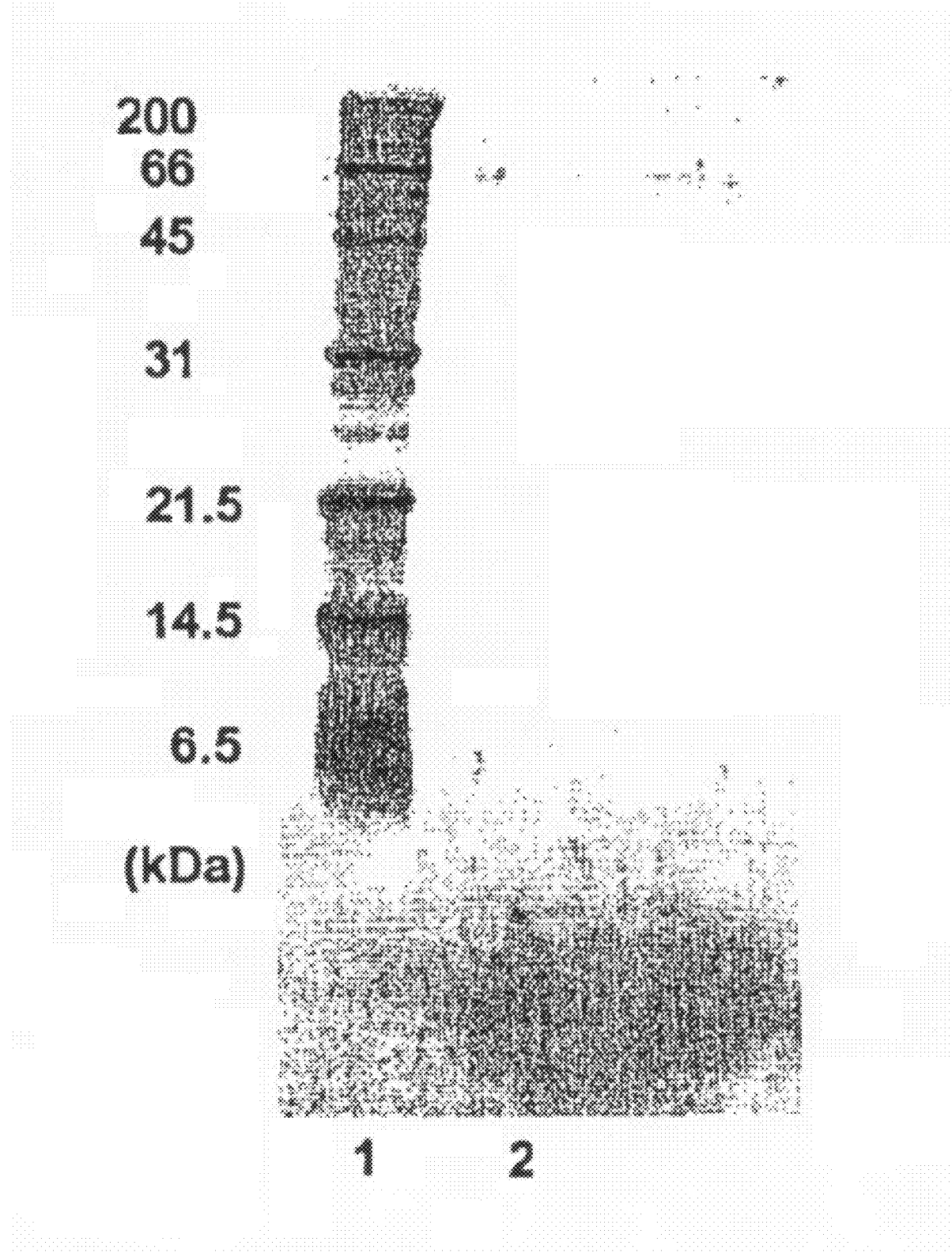
FIG. 5 is a diagram showing the result of measurement of the natural rubber obtained in Example 9 of the present invention by SDS-PAGE.

The coagulated natural rubber after saponification (before drying in Example 3) obtained in Example 3 was further immersed in a 2% (w/v) NaOH aqueous solution at room temperature for 1 day, washed with water and dried, and then subjected to an SDS-PAGE test. The result is shown in FIG. 5. In FIG. 5, Lane 1 denotes standard molecular weight markers, and Lane 2 is the result of Example 9. It is clear that the specific protein bands completely disappeared by the above treatment.

Examples 10 to 12

The procedure of Example 1 was repeated except that compounds shown in Table 2 were used as surfactants in place of Triton-X100. As a result, it was found that none of the rubbers of Examples 10 to 12 contained proteins specified by the bands of 14, 31 and 45 kDa as measured by SDS-PAGE.

TABLE 2

| | Surfactants | Amount (Based on Rubber, 100 prt) | Nitrogen Content (%) | Proteins (kDa) 14, 31, 45 |
|---|---|---|---|---|
| Ex. 10 | Polyoxyethylene Lauryl Ether | 0.3 | 0.145 | Not Exist |
| Ex. 11 | Polyoxyethylene Oleyl Ether | 0.3 | 0.168 | Not Exist |
| Ex. 12 | Sodium Dodecyl benzene Sulfonate | 0.4 | 0.173 | Not Exist |

Ex. = Example

Examples 13 and 14 and Comparative Examples 2 to 4

Allergy tests of saponified natural rubber and deproteinized natural rubbers were conducted. It was checked whether trace amounts of nitrogenous compounds present in the rubbers contained Type I acute allergy antigens.

For comparison, deproteinized natural rubbers (DPNR) by the use of a proteolytic enzyme were tested under the same conditions.

The experiments were conducted by the analysis of proteins with enzyme-linked immunosorbent assay (ELISA) using FIT Kit of FIT BIOTECK CO., LTD. The results are shown in Table 3.

TABLE 3

| | Amount of Protein by ELISA (µg/ml) | | | | | N |
|---|---|---|---|---|---|---|
| | Hev b1 | Hev b3 | Hev b5 | Hev b6.02 | Total | (%) |
| Ex. 13 | ND | ND | ND | ND | ND | 0.133 |
| Ex. 14 | ND | ND | ND | ND | ND | 0.035 |
| C. Ex. 2 | 203 | 104 | 13 | 247 | 567 | 0.721 |
| C. Ex. 3 | ND | ND | ND | 14 | 14 | 0.177 |
| C. Ex. 4 | ND | ND | ND | 1.5 | 1.5 | 0.035 |

Ex. = Example, C. Ex. = Comparative Example
(Hev b1: MW 14.6 kDa, Hev b3: MW 22.3 kDa, Hev b5: MW 17.5 kDa and Hev b6.02: MW 4.7 kDa are proteins referred to as Rubber elongation factor, Small rubber particle protein, Acidic latex protein and Mature Hevein, respectively.)

The samples were prepared in the following manner.

For Example 13, a sample prepared by saponifying fresh rubber latex with 1% (w/v) NaOH at 70° C. for 1 hour was used and the resulting rubber was post-treated under the same conditions as used in Example 1. For Example 14, a sample prepared by immersing the rubber of Example 13 in a 2% (w/v) NaOH aqueous solution at room temperature for 1 day was used. For Comparative Example 2, a sample prepared by coagulating fresh natural rubber latex was used. For Comparative Example 3, a sample prepared by treating fresh latex with the proteolytic enzyme Alcalase 2.0 T (NOVO Nordisk Bioindustry Co.) followed by coagulation of the resulting latex was used. For Comparative Example 4, a sample deproteinized by use of the proteolytic enzyme as in the case of Comparative Example 3, followed by centrifuging the resulting sample twice and then coagulating the latex was used.

The results are as follows. That is, proteins were detected from Comparative Examples 2, 3 and 4, and no protein was detected from Examples 13 and 14. Thus, it was confirmed that the natural rubbers deproteinized by saponification were free from the possibility of causing allergy.

Examples 15 and 16 and Comparative Examples 5 and 6

For Example 15, a sample latex was obtained by adding aqueous solution of NaOH containing 30 g of NaOH in 100 mL water and 4 g of Triton X-100 as a nonionic surfactant to 2 L of fresh latex with a DRC of 30% so as to saponify the latex at 70° C. for 3 hours. The obtained latex was poured onto a glass plate and dried at 50° C. for 1 day so as to obtain a film. After rinsed with water, an antioxidant was added to the film by a method of immersing the film in a 1% (w/v) aqueous emulsion of BHT. Example 16 was obtained by immersing the film of Example 15 in a 2% (w/v) NaOH aqueous solution at room temperature for 1 day. The film was also immersed in the aqueous emulsion of BHT so as to add the antioxidant to the film.

For Comparative Example 5, a sample latex was prepared by use of a commercially available solid natural rubber having a Mooney viscosity of 60, and for Comparative Example 6, a sample latex was prepared by use of natural rubber obtained by coagulating fresh natural rubber latex with Floerger and formic acid as coagulant.

The physical properties of unvulcanized and vulcanized rubbers were measured by use of Rubber Process Analyzer RPA2000 (Alpha Technology Co) (RPA). The conditions for mixing and vulcanization of the rubbers are as shown below. The rubbers and rubber chemicals were mixed together at 50° C. for 13 minutes by use of a 0.5 L internal mixer. After the obtained rubber compounds were passed through 2-inch rollers twice, they were kept in the dark at room temperature for 24 hours until vulcanization. They were vulcanized at 155° C. by use of the following compounding recipe (Table 4). The physical properties of vulcanizates are shown in Table 5.

TABLE 4

| Recipe | With Carbon Black (CB) | Without Carbon Black (CB) |
|---|---|---|
| Rubber | 100 | 100 |
| CB | 35 | — |
| Sulfur | 2 | 2 |
| Stearic Acid | 3 | 3 |
| ZnO | 5 | 5 |
| MBT | 1 | 1 |
| Antioxidant (6PPD) | 2 | 2 |

Numeric values: phr
Note)
MBT: 2-mercaptobenzothiazole (vulcanization accelerator)
6PPD: N-(1,3-dimethylbutyl)-N'-phenyl-p-phenylenediamine

TABLE 5

| | C. Ex. 5 | C. Ex. 6 | Ex. 15 | Ex. 16 |
|---|---|---|---|---|
| With CB | | | | |
| Scorch Time (t2) | 2.09 | 1.40 | 1.23 | 1.13 |
| Cure time (t90) | 7.30 | 6.07 | 5.37 | 4.48 |
| Tb | 21.9 | 23.8 | 21.3 | 24.3 |
| Eb (%) | 580 | 540 | 530 | 540 |
| M 100 (MPa) | 1.30 | 1.43 | 1.40 | 1.43 |
| M 300 (MPa) | 5.32 | 7.30 | 7.11 | 7.13 |
| M 500 (MPa) | 15.2 | 18.6 | 18.6 | 20.5 |
| Without CB | | | | |
| Scorch Time (t2) | 3.04 | 1.35 | 1.20 | 1.05 |
| Cure time (t90) | 7.27 | 5.09 | 5.09 | 4.24 |
| Tb | 16.0 | 15.1 | 8.78 | 14.3 |
| Eb (%) | 830 | 800 | 680 | 760 |
| M 100 (MPa) | 0.50 | 0.52 | 0.53 | 0.56 |
| M 300 (MPa) | 1.02 | 1.12 | 1.14 | 1.28 |
| M 500 (MPa) | 2.03 | 2.34 | 2.78 | 2.44 |

Ex. = Example, C. Ex. = Comparative Example

Figure 6:
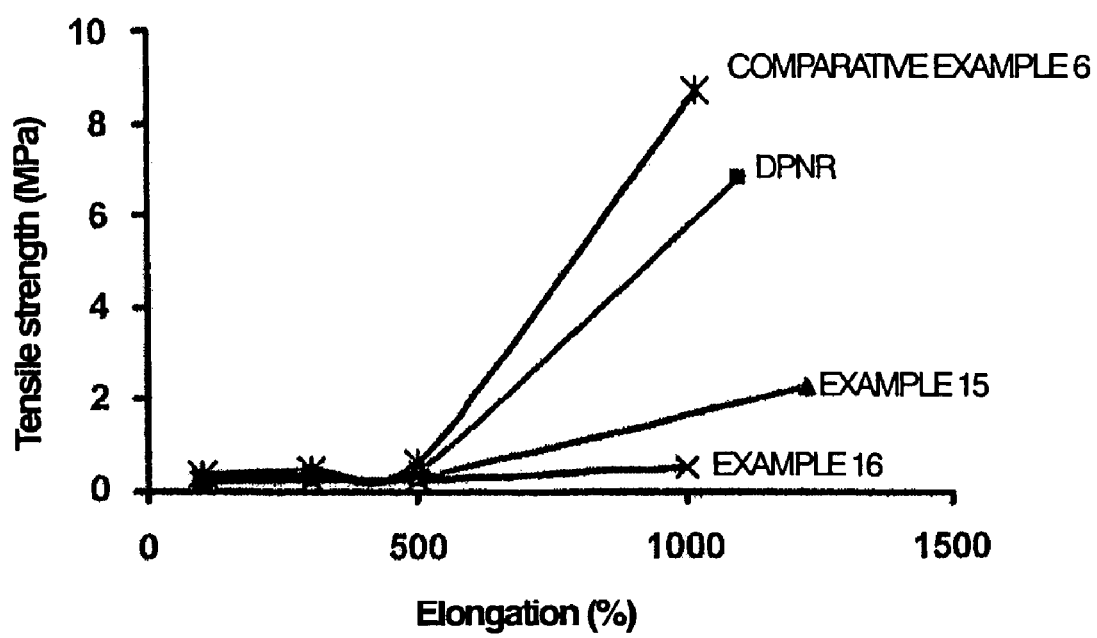
FIG. 6 is a diagram showing comparisons of the green strength of the natural rubbers (Examples 15 and 16) of the present invention, natural rubber (Comparative Example 6) and deproteinized natural rubber by enzymatic deproteinization.

Further, the green strength of the saponified natural rubbers is shown in FIG. 6. The green strength decreased in the order of Comparative Example 6>DPNR>Example 15>Example 16. The green strength of the saponified natural rubbers is much smaller than those of natural rubber (FNR) and natural rubber deproteinized by use of the proteolytic enzyme (DPNR).

Example 17

The properties of vulcanized products from blended rubbers of saponified natural rubbers with emulsion SBR are shown.

The saponified natural rubbers were prepared in the following manner. Into 1.9 L of flesh natural rubber latex (FL-latex), 100 mL of aqueous solution containing 4 g of nonionic surfactant Toriton X-100 and 30 g of NaOH were added. The mixture was reacted at 70° C. for 3 hours so as to saponify the latex. The resulting latex was coagulated with a polymer flocculant, Floerger, and formic acid and then rinsed with water.

The obtained rubber was immersed in BHT (an antioxidant: Butylated hydroxy toluene) aqueous emulsion dispersed at a concentration of 1% (w/v) in aqueous solution of 0.5% (w/v) SDS at 50° C. for 24 hours. The sample was dried at 50° C. for 24 hours (Sample SAP-H).

The SAP-H obtained thus was further immersed in a 2% (w/v) NaOH aqueous solution at room temperature for 24 hours, rinsed with water and then treated in the same manner as SAP-H so as to prepare a sample (SAP-L) having a reduced nitrogen content.

The nitrogen content of SAP-H and SAP-L was 0.110% and 0.094%, respectively. Further, it was confirmed that both samples contained no protein showing the bands of 14, 31 and 45 kDa as measured by SDS-PAGE.

Both samples were blended with SBR1502 according to the compounding recipe (recipe for tire carcass) in the following Table 6 so as to prepare vulcanized compositions. The vulcanized physical properties thereof were measured.

TABLE 6

| NR | 50 phr |
|---|---|
| SBR1502 | 70 phr |
| CBN660 | 43 phr |
| Aromatic Oil | 8 phr |
| ZnO | 4 phr |
| Stearic Acid | 1.5 phr |
| TMQ | 1.5 phr |
| MBT | 0.5 phr |
| TMTD | 1 phr |
| Sulfur | 2.5 phr |

TMQ: Polymerized 2,2,4-trimethyl-dihydroquinone (antioxidant)
MBT: 2-mercaptobenzothiazole (vulcanization accelerator)
TMTD: tetramethylthiuramdisulfide (vulcanization accelerator)

Mixing was carried out by use of a small-sized mill, and vulcanization was carried out in the form of a sheet having a thickness of 1 mm. The vulcanization temperature was 155° C., and the vulcanization time was changed in accordance with the vulcanization time measured by RPA.

The properties of the vulcanized compositions are shown in the following Table 7.

TABLE 7

| | FNR | SAP-H | SAP-L |
|---|---|---|---|
| Scorch Time | 1.50 | 1.45 | 1.40 |
| Cure Time | 3.42 | 3.30 | 3.14 |
| Tb (MPa) | 12.59 | 11.49 | 11.87 |
| Eb (%) | 338 | 323 | 331 |
| 100M (MPa) | 2.58 | 2.38 | 2.41 |
| 300M (MPa) | 9.86 | 8.42 | 10.41 |

The following Table 8 shows the dynamic properties and abrasion resistances of the vulcanized compositions.

TABLE 8

| | FNR | SAP-H | SAP-L |
|---|---|---|---|
| Storage Modulus E' (MPa) | 5.172 | 5.080 | 5.069 |
| Loss of Modulus E'' (MPa) | 0.162 | 0.152 | 0.153 |
| Tan δ | 0.031 | 0.030 | 0.030 |
| Heat Build Up (° C.) | 8.0 | 9.5 | 9.0 |
| Dynamic Compression Set (%) | 2.7 | 0.8 | 0 |
| Abrasion (cm$^3$) | 0.100 | 0.098 | 0.106 |

In Tables 7 and 8, FNR represents rubber obtained by coagulating fresh natural rubber latex with acetone. Both SAP-H and SAP-L showed vulcanization physical properties, dynamic properties and abrasion resistances comparable to those of the natural rubber and SBR vulcanized composition.

The invention claimed is:
1. Natural rubber which contains proteins having a molecular weight of more than 14 kDa, substantially no proteolytic enzyme and its decomposed compounds and substantially no proteins specified by the bands of 14, 31 and 45 kDa by SDS-PAGE and having a nitrogen content of 0.02 to 0.30% by weight of natural rubber, said natural rubber originating from natural rubber latex containing allergic proteins, which allergic proteins cause Type I allergy.

2. The rubber of claim 1, the crude rubber of which shows a green strength of 0.1 to 3 MPa (Mega Pascal).

3. A rubber composition which comprises the natural rubber of claim 1 and other rubber.

4. The composition of claim 3, wherein the other rubber is styrene butadiene rubber (SBR), acrylonitrile butadiene rubber (NBR), polybutadiene rubber (BR), synthetic polyisoprene (IR), ethylene propylene rubber (EPR), ethylene propylene diene monomer rubber (EPDM) and isobutylene isoprene rubber (IIR).

5. A tire made from the natural rubber of claim 1.

6. Natural rubber which at least contains proteins having a molecular weight of 6.6 kDa to 200 kDa but substantially no proteolytic enzyme and its decomposed compounds and substantially no proteins specified by the bands of 14, 31 and 45 kDa by SDS-PAGE and which has a nitrogen content of 0.02 to 0.30% by weight of natural rubber, said natural rubber originating from natural rubber latex containing allergic proteins, which allergic proteins cause Type I allergy.

* * * * *